July 4, 1944.  J. F. FANES  2,353,021
SELF-AUTOMATIC MECHANICAL JACK
Filed April 13, 1942  2 Sheets-Sheet 1
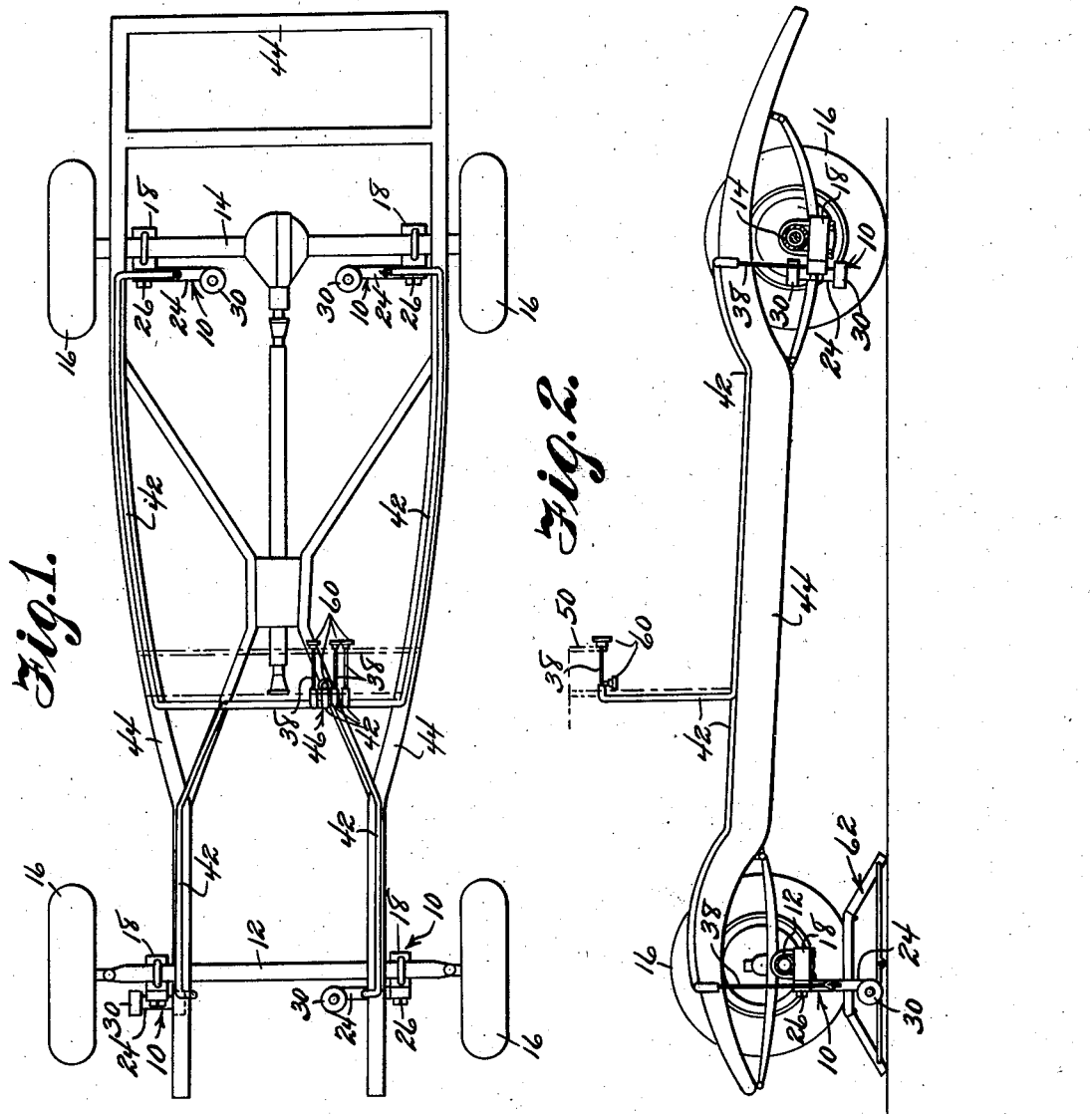
Juan F. Fanes INVENTOR.
BY
Victor J. Evans & Co.
ATTORNEYS

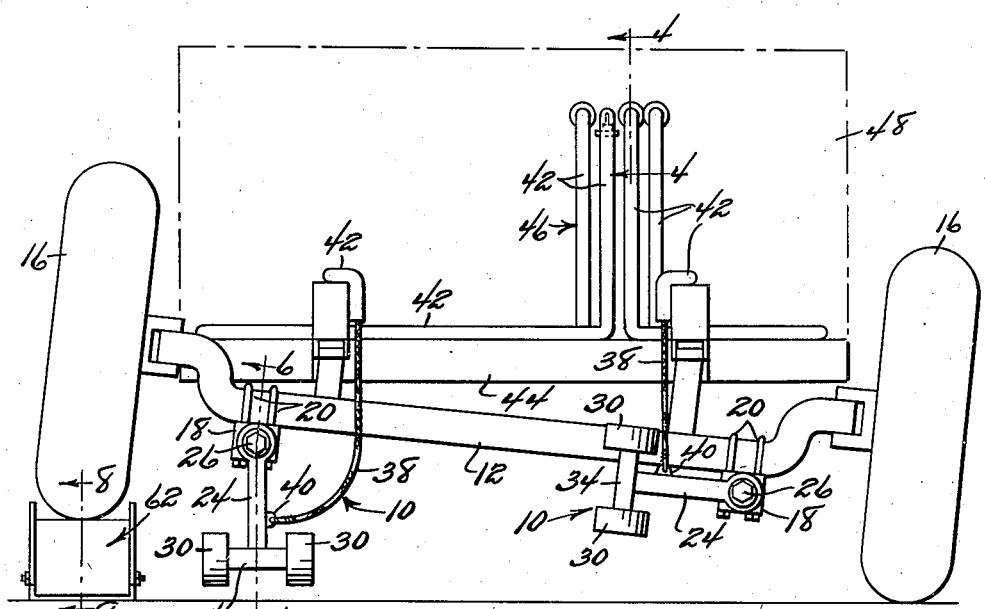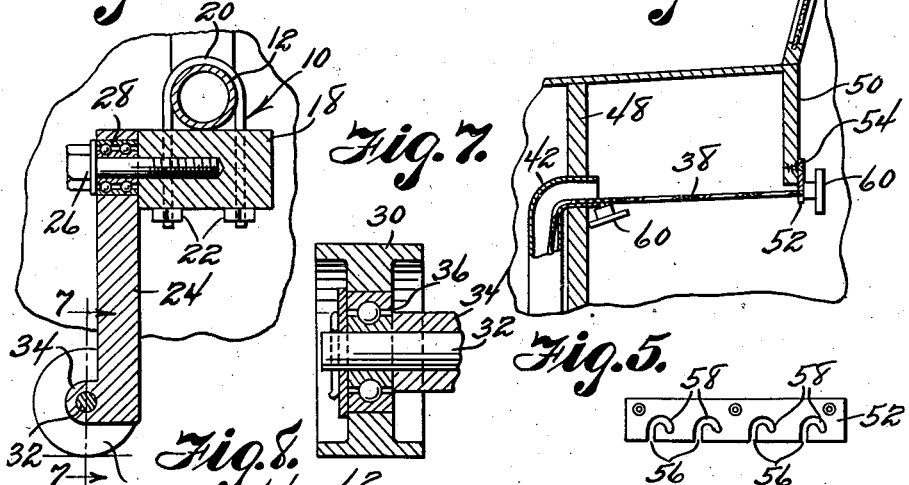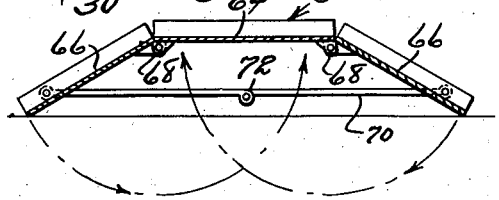

Patented July 4, 1944

2,353,021

UNITED STATES PATENT OFFICE 2,353,021

SELF-AUTOMATIC MECHANICAL JACK

Juan Falguera Fanés, Mexico City, Mexico

Application April 13, 1942, Serial No. 438,801

2 Claims. (Cl. 248—352)

My invention relates to automotive vehicles, and has among its objects and advantages the provision of an improved jack structure which may be mounted on the vehicle and selectively actuated to support wheels off the ground, in which the construction is such as to permit a predetermined jack to be easily lowered to its supporting position when its associated wheel is elevated, as by running the wheel upon an elevator, and in which novel jack actuating means are employed.

In the accompanying drawings:

Figure 1 is a plan view of a conventional automotive vehicle frame and wheel structure illustrating my jack applied thereto.

Figure 2 is a side view.

Figure 3 is an enlarged end elevational view of the invention.

Figure 4 is a sectional view taken along the line 4—4 of Figure 3.

Figure 5 is a face view of a latch plate.

Figure 6 is an enlarged sectional view along the line 6—6 of Figure 3.

Figure 7 is an enlarged sectional view taken along the line 7—7 of Figure 6, and Figure 8 is a sectional view taken along the line 8—8 of Figure 3.

In the embodiment of the invention selected for illustration, I make use of four jack units 10. Figures 1 and 2 illustrate the units 10 as being mounted on the front and rear axles 12 and 14. One jack unit is provided for each of the wheels 16. All the jack units are located relatively close to their respective wheels 16.

All the jack units 10 are identical in construction, so that the description of one will apply to all. In Figures 3 and 6, the jack unit 10 comprises a body 18 which is clamped to the axle 12 by U-bolts 20 extending over the axle and passing through the bodies 18. Nuts 22 are threaded on the U-bolts to clamp the body 18 firmly against the axle.

A jack arm 24 is pivotally mounted on a supporting bolt 26 threaded into the body 18, and a bearing 28 is interposed between the jack arm and the bolt. Two ground engaging wheels or rollers 30 are rotatably mounted on a shaft 32 extending through a horizontal sleeve formation 34 at the lower end of the arm. Roller bearings 36 are provided for the wheels 30. The shaft 30 lies in parallelism with the axle 12 when the jack unit 10 is lowered to the position of Figure 6, at which time the wheels 30 roll freely on the road face.

Means for manipulating the jack units 10 to operative and inoperative positions comprise cables 38 each attached at one end to one jack arm 24 adjacent its outer end, as by looping the cable through an eye 40 on the arm. These cables are slidably guided in tubes 42 mounted on the vehicle frame 44. All the tubes are grouped at 46, see Figure 3, and extend upwardly and through the fire wall 48 of the vehicle, as best illustrated in Figure 4. To the instrument panel 50 of the vehicle is attached a latch plate 52 by bolts or screws 54. This plate extends a short distance beneath the instrument panel 50 and is provided with four slots 56, see Figure 5, each of which extends upwardly from the lower edge of the plate 52 and then downwardly at 58. Each cable 38 is provided with a knob 60 at its end remote from its jack arm 24. Each slot 56 receives one cable 38, and the knobs 60 constitute abutments which engage the plate 52 to hold the cables in their retracted positions, at which time the jack arms 24 are supported in parallism with their respective vehicle axles. When in this position, the jack units are elevated to provide ample clearance and the jack units may be lowered by merely slipping their respective cables from the slots 56 and dropping the cables to permit the jacks to gravitate to vertical positions. Each jack is independently controlled.

Figures 2, 3 and 8 illustrate an elevator 62 which is employed as an aid in lifting one end of either axle by rolling one wheel of that axle onto the elevator. Figures 2 and 3 illustrate one front wheel as being positioned on the elevator, at which time the wheel and the axle are lifted sufficiently far to provide sufficient clearance for lowering the adjacent jack unit to its load supporting position, after which the vehicle is moved forwardly or rearwardly sufficiently far to bring the axle at rest on the jack unit, with the wheel held off the ground.

The elevator 62 comprises a center plate 64 and two end plates 66 pivotally connected therewith at 68. Two tie rods 70 are attached to each end plate 66, the four tie rods being pivotally connected in pairs at 72 to hold the end plate 66 in the angular position of Figure 8 when the vehicle wheel is rolled upon the elevator. The rods 70 and the plates 64 and 66 may be folded into a compact unit to facilitate storage in the vehicle.

Without further elaboration, the foregoing will so fully explain my invention, that others may, by applying current knowledge, readily adapt the same for use under various conditions of service.

I claim:

1. In an automotive vehicle, the combination of supporting wheels and axles connected therewith for supporting the vehicle, bodies clamped to the axles adjacent the respective wheels, jack arms pivotally connected with the respective bodies and having road engaging rollers at their free ends, a fixed latch plate provided with slots, fixed guide tubes leading from a group position adjacent said slotted plate to positions adjacent the respective bodies, lines attached to the respective jack arms and slidably guided in the respective tubes for lifting said jack arms and holding the latter in inoperative positions, and means on said lines engageable with said plate when the lines are slipped in the respective slots in the plate to hold the lines and the jack arms in retracted positions.

2. An automobile jack comprising a pivot element adapted to be rigidly mounted on an automobile adjacent each wheel, said pivot element being adapted for disposition longitudinally of the vehicle, a jack arm extending radially of said pivot element and having its inner end rotatably mounted thereon, a sleeve formed on the outer end of the arm and extending transversely thereof, a shaft journaled in said sleeve and having end portions projecting from each end thereof, and a roller mounted on each projecting end portion of the shaft.

JUAN F. FANÉS.